(12) United States Patent
Rossi et al.

(10) Patent No.: US 11,079,553 B2
(45) Date of Patent: Aug. 3, 2021

(54) FIELD INSTALLABLE RUGGED OPTICAL TERMINUS

(71) Applicant: COTSWORKS, LLC, Highland Heights, OH (US)

(72) Inventors: Nick Rossi, Cleveland, OH (US); Eugen Artemie, Highland Heights, OH (US)

(73) Assignee: COTSWORKS, LLC, Highland Heights, OH (US)

( * ) Notice: Subject to any disclaimer, the term of this patent is extended or adjusted under 35 U.S.C. 154(b) by 0 days.

(21) Appl. No.: 16/548,630

(22) Filed: Aug. 22, 2019

(65) Prior Publication Data

US 2021/0055483 A1 Feb. 25, 2021

(51) Int. Cl.
*G02B 6/38* (2006.01)
*G02B 6/44* (2006.01)

(52) U.S. Cl.
CPC ......... *G02B 6/3846* (2013.01); *G02B 6/3889* (2013.01); *G02B 6/4471* (2013.01)

(58) Field of Classification Search
None
See application file for complete search history.

(56) References Cited

U.S. PATENT DOCUMENTS

| | | | |
|---|---|---|---|
| 5,905,834 A | 5/1999 | Anderson | |
| 6,068,410 A | 5/2000 | Giebel | |
| 6,173,097 B1 * | 1/2001 | Throckmorton | G02B 6/3806 385/56 |
| 6,648,521 B2 | 11/2003 | Roehrs | |
| 7,204,644 B2 * | 4/2007 | Barnes | G02B 6/3806 385/139 |
| 7,280,733 B2 * | 10/2007 | Larson | G02B 6/3801 385/134 |
| 7,329,049 B2 | 2/2008 | Meek | |
| 7,369,738 B2 * | 5/2008 | Larson | G02B 6/3801 385/134 |
| 7,680,384 B2 | 3/2010 | Billman | |
| 8,094,988 B2 * | 1/2012 | Billman | G02B 6/3802 385/134 |
| 8,718,433 B2 | 5/2014 | Billman | |

(Continued)

OTHER PUBLICATIONS

Integrated Systems, "Improving Fiber Optic Connection and Splicing Techniques," Jul. 2001, 10 pages.

(Continued)

*Primary Examiner* — Rhonda S Peace
(74) *Attorney, Agent, or Firm* — Tucker Ellis LLP

(57) ABSTRACT

A terminus for a fiber optic cable has a ferrule with a fiber stub secured in a channel of the ferrule. The fiber stub has a polished forward end face. The fiber stub extends from a rearward end of the ferrule so that a rearward end face of the fiber stub is rearwardly spaced from the ferrule. An alignment member is axially aligned with the ferrule and has a channel extending between forward and rearward ends of the alignment member. The channel includes a fiber alignment portion in which the rearward end face of the fiber stub is received. The fiber alignment portion is statically configured to receive a forward end face of the filament of the fiber optic cable in opposed relationship to the rearward end face of the fiber stub and axially align the faces to each other.

32 Claims, 6 Drawing Sheets

(56) References Cited

U.S. PATENT DOCUMENTS

| | | |
|---|---|---|
| RE45,482 E | 4/2015 | Barnes |
| 9,016,953 B2 * | 4/2015 | Ott .................. G02B 6/3821 |
| | | 385/60 |
| 9,052,469 B2 * | 6/2015 | Bauco ................ G02B 6/3855 |
| RE46,270 E | 1/2017 | Barnes |
| 9,983,366 B2 * | 5/2018 | Bund .................. G02B 6/3869 |
| 2003/0152333 A1 | 8/2003 | Gilligan |
| 2007/0127873 A1 | 6/2007 | Manning et al. |
| 2011/0116749 A1 | 5/2011 | Kuffel et al. |
| 2018/0067262 A1 | 3/2018 | Larson et al. |

OTHER PUBLICATIONS

Extended European Search Report for European Patent Application No. 19216022.4, dated Jul. 20, 2020, 9 pages.

* cited by examiner

FIELD INSTALLABLE RUGGED OPTICAL TERMINUS

TECHNICAL FIELD OF THE INVENTION

The technology of the present disclosure relates generally to fiber optic cables and, more particularly, to a rugged terminus that is field installable to terminate a fiber optic cable.

BACKGROUND

Military, commercial avionics, and industrial networking equipment manufacturers are adopting fiber optic components for communication applications. An exemplary communication application is to create an operative communication link between a control system and a sensor or other data collection device. Fiber optic links are often used to replace existing electrical (e.g., "copper") wiring architectures because they provide higher speed, improved electromagnetic interference (EMI) performance, lower weight, and increased density. Other advantages of fiber optic links include higher data capacity using multiple wavelengths and running multiple protocols on the same fiber. As a result of these advantages, system upgrades often may be made without replacing the existing fiber optic cable which may run in an area that is difficult to access.

Most fiber optic products are designed for the telecommunications market. But these products are generally not rugged enough to withstand the environmental factors that would adversely affect fiber optic systems in harsh operating environments where extreme states of vibration, shock, and temperature may be present.

One component of a fiber optic link that may be ruggedized is the terminus that terminates the fiber optic cable. A common terminus that is considered rugged enough for harsh environments, such as in off-road and military vehicles, airplanes, helicopters, spacecraft, etc., is an ARINC 801 terminus. An exemplary ARINC 801 terminus 10 is shown in cross-section in FIG. 1. An exemplary fiber optic cable that is terminated by the exemplary ARINC 801 terminus is shown in FIG. 2.

In FIG. 2, various layers of the fiber optic cable 12 have been cut away to show underlying layers. The fiber optic cable 12 includes a fiber optic filament 14, which is sometimes referred to as a fiber. The fiber optic filament 14 allows light signals to propagate therein to carry out optical communications between optical transceivers (not shown) located at the respective ends of the fiber optic cable 12. The fiber optic filament 14 may include a core and a cladding, which are typically made of glass or plastic. In some fiber optic cables, the filament 14 may be coated with an inner coating layer (not shown in FIG. 2) known as a primary buffer or simply as a coating. The inner coating layer may be made from acrylate or polyimide, for example.

The fiber optic filament 14 (and inner coating layer, if present) is surrounded by one or more coating layers, such as the illustrated buffer 16. The buffer 16 may be referred to as a secondary buffer. The buffer 16 may be made from PTFE, for example. In the illustrated embodiment, the buffer 16 is surrounded by strength members 18, such as aramid yarn. One or more jacketing layers, also referred to as a jacket 20, surround the strength members 18. The jacket 20 may be made from PFA, for example.

One type of fiber optic cable 12 has a loose jacket and a tight buffer. In this type of cable, the cable 12 is constructed so that the jacket 20 is able to move along a longitudinal axis of the fiber optic cable 12 relative to the buffer 16. This relative movement tends to correspond to movement and bending of the cable 12 and/or to differing rates of thermal expansion or contraction among the layers of the cable 12 during exposure to hot or cold temperatures. The ability of the jacket 20 to move relative to the buffer 16 give rise to the term "loose jacket" since the jacket 20 is "loose" enough about the buffer 16 to allow for the movement. Also, in this type of cable, the buffer 16 does not move longitudinally relative to the filament 14. The inability of the buffer 16 to move relative to the filament 14 gives rise to the term "tight buffer" since the buffer 16 is "tight" about the filament 14 and imposes sufficient friction to resist movement. In the case of the loose jacket and a tight buffer fiber optic cable, the buffer 16 and filament 14 move together relative to the jacket 20. As used herein, the term "loose jacket" includes "semi-loose jacket," which is a term used in industry to refer to a cable 12 having a jacket 20 that is less loose than other loose jacket cables 12.

Another type of fiber optic cable 12 has a tight jacket and a loose buffer. In this type of cable, the cable 12 is constructed so that the jacket 20 does not move longitudinally relative to the buffer 16. The inability of the jacket 20 to move relative to the buffer 16 gives rise to the term "tight jacket" since the jacket 20 is "tight" about the buffer 16 and imposes sufficient friction to resist movement. Also, in this type of cable, the buffer 16 is able to move along the longitudinal axis of the fiber optic cable 12 relative to the filament 14. This is achieved by the filament 14 (or primary buffer, if present) having a smaller outside diameter than the inside diameter of the secondary buffer 16. This relative movement tends to correspond to movement and bending of the cable 12 and/or to differing rates of thermal expansion or contraction among the layers of the cable 12 during exposure to hot or cold temperatures. The ability of the buffer 16 to move relative to the filament 14 gives rise to the term "loose buffer" since the buffer 16 is "loose" enough about the jacket 14 to allow for the movement. As used herein, the term "loose buffer" includes "semi-loose buffer," which is a term used in industry to refer to a cable 12 having a buffer 16 that is less loose than other loose buffer cables 12.

One other type of fiber optic cable is a fiber optic cable 12 with a tight jacket and a tight buffer. In this type of cable, the cable 12 is constructed with both the tight jacket and the tight buffer properties described above. As such, the jacket 20 does not move longitudinally relative to the buffer 16 and the buffer 16 does not move longitudinally relative to the filament 14.

One other type of fiber optic cable is a fiber optic cable 12 with a loose jacket and a loose buffer. In this type of cable, the cable 12 is constructed with both the loose jacket and the loose buffer properties described above. As such, the buffer 16 may move relative to both the filament 14 and the jacket 20.

In each of these fiber optic cable types, if the inner coating layer is present, the inner coating layer does not move longitudinally relative to the filament 14. Thus, the inner coating layer may be considered tight to the filament 14. In cases where the inner coating layer is present and there is a tight buffer 16, each of the buffer 16, the inner coating layer and filament 14 do not longitudinally move relative to one another. Hence, the buffer 16 may still be referred to as a tight buffer. In cases where the inner coating layer is present and there is a loose buffer 16, the inner coating layer and filament 14 do not longitudinally move relative to one another but the inner coating layer and filament 14 move together relative to the buffer 16. Hence, the buffer 16 may still be referred to as a loose buffer.

Loose buffer cable arrangements are sometimes referred to as "loose tube" cables.

The relative amount of friction between the layers of the fiber optic cable 12 is typically established by the manner in which the fiber optic cable 12 is manufactured, such as by coextruding layers to be either "tight" with respect to each other or "loose" with respect to each other. It will be appreciated that a tight jacket may still allow for some local movement of the buffer 16 with respect to the jacket 20 and/or a tight buffer may still allow for some local movement of the filament 14 with respect to the buffer 16. But movement over relatively long distances will tend not to occur under normal operating conditions for tight configurations, including harsh conditions with high amounts of shock, vibration or temperature variations, such as that found in off-road and military vehicles, airplanes, helicopters, spacecraft, etc.

Connectors for fiber optic cables have integral dynamic retention mechanisms, such as a flexible tab or latch that catches on a coordinating feature of a receptacle. A terminus for rugged applications may be distinguished from a connector by a lack of a dynamic retention mechanism integrated with the terminus. Thus, a terminus is typically installed in a connector and the connector has a retention mechanism for retaining the terminus. The connector, in turn, may be installed in a receptacle associated with a transceiver and the dynamic retention mechanism of the connector latches to the receptacle. Some connectors may have multiple ports and retention mechanisms for retaining a plurality termini. In the example of an ARINC 801, the retention mechanism may be resilient metal fingers (not shown) that engage a shoulder on the terminus body (described below). In other arrangements, the terminus is installed in a housing that includes a transceiver and retention components (e.g., resilient fingers) to retain the terminus.

Termini for rugged applications are typically of metal construction and are terminated to fiber optic cables using factory termination. That is, for use in harsh environments, it is typical that the cable 12 is connected to the terminus (e.g., terminus 10) in a factory setting to ensure proper termination. In the case of the terminus 10, the filament 14 (optical fiber) is terminated to a ceramic ferrule 22. The ferrule 22 has precise inside and outside diameters and concentricity about the filament 14. A secure connection is made between the filament 14 and the ferrule 22 with robust heat curable adhesive. An excess length of filament 14 that extends past the front end of the ferrule 22 is then cleaved, polished, and inspected. The resulting termination has excellent optical performance through the passive alignment provided by the ceramic ferrule 22 and the polish on the fiber end face. This type of termination also provides excellent mechanical performance by rigidly fixing the fiber within the ferrule 22, which is a very hard ceramic component capable of withstanding many mating cycles and repeated mechanical stresses.

The ferrule 22 is held by a ferrule holder 24 which is retained in a terminus body 26. The ferrule holder 24 and ferrule 22 are allowed to piston within the terminus body 26. A spring 28 forwardly biases the ferrule holder 24 and ferrule 22. The strength members 18 and jacket 20 in the illustrated example are secured to a rearward portion of the terminus body 26 by a crimp sleeve 30 that is crimped about an anchor portion of the terminus body 26. The buffer 16 is supported by the terminus body 26 and the ferrule holder 24.

It is typical that the factory termination of the cable 12 includes bonding the buffer 16 to the ferrule holder 24 with heat curable adhesive. Together with the other secure connections in the terminus 10, securing the buffer 16 to the ferrule holder 24 results in the joining of the ferrule 22, fiber (filament 14), ferrule holder 24 and the buffer 16 as a unit that moves together relative to the terminus body 26. As indicated, the terminus body 26 has a shoulder 32 against which a latching finger of a receptacle may engage.

Instead of a mechanical crimp connection, some termini employ a bonding cup. A bonding cup is a receptacle for adhesive to flow around the strength member and jacket to attach the cable to the body of the terminus.

In rugged applications, the retention of the strength member and jacket to the terminus body is often separate from the retention of the fiber and secondary buffer. This allows for relative movement between the fiber and the secondary buffer and allows for relative movement between the fiber and the strength members/jacket. This configuration is referred to as being "pull-proof" since it prevents forces that are applied to the jacket from being applied to the ferrule and the fiber end face. Otherwise, these forces could create an air gap between the fiber and an optical element to which the forward end face of the fiber is intended to engage. An air gap will result in loss of communicative connection.

Unfortunately, this factory termination process requires hours to cure the adhesive and to cleave, polish and inspect the fiber. The process also involves numerous pieces of bench top equipment to ensure the termination is successful. As a result, this process is not well suited for field termination of fiber optic cables.

Attempts have been made to fabricate a terminus that is field installable, but with the benefits of a factory termination. The resulting products are known as "splice-on" or "pre-terminated" connectors in which a fiber stub is terminated to a ferrule in the factory. Also, in factory, the fiber stub's forward end is polished and the rearward end face is precision cleaved and ends either in or immediately behind the connector. The cleaved end face of this terminated and polished fiber can then be aligned and coupled to a cleaved end face of a fiber during field installation without factory equipment and processes. This cleaved end face coupling can have excellent optical performance when done correctly, contributing only negligible loss to the connector or terminus performance.

But there are disadvantages to conventional splice-on and pre-terminated connectors when it comes to rugged applications, as will be discussed. Fiber optic connectors in environments with extreme temperatures and mechanical stresses often involve special design features and considerations that are not found in connectors used for fiber optic applications in less harsh environments, such as in-building and data center applications. For instance, for rugged connectors, metal construction is preferred, along with more temperature resistant materials and adhesives. Even the fiber optic cable itself may require modifications to function in such an environment. For instance, there is a preference in the avionics industry for loose buffer cable construction over tight buffer cable construction, which is more prevalent in the telecommunications industry. The loose buffer construction and ability of the filament 14 to move axially relative to the buffer 16 mitigates stresses that would otherwise be applied directly to the filament 14 by the buffer 16 in a tight buffer construction.

Although loose buffer construction may be advantageous along the length of the cable itself, it can be problematic within a connector or terminus, especially when exposed to mechanical stresses. For instance, in conventional splice-on and pre-terminated connectors, the secondary buffer may move relative to the terminated fiber and adhered ferrule. This is undesirable because the secondary buffer supports the fiber radially within the connector or terminus and may lead to breakage of the fiber within the connector or terminus.

In splice-on or pre-terminated connectors, index matching gel may be used to fill gaps between the end faces of the fibers. Instant adhesive or mechanical retention (e.g., a crimp) may be used to secure the jacket, strength members or the secondary buffer to the connector body or other member, but the position of the adhesive or mechanical retention is separated from the joint between the end faces of the fibers. The distance between the retention and the end face is too great to adequately support the filament for rugged operation. For example, instant adhesives are not fit for cure near the optical end face due to the index of refraction of the adhesive when cured. Also, mechanical retention of the fiber itself would introduce a risk of damage during installation. Accordingly, the available retention methods are applied to the buffer or to a higher layer of the cable structure. In rugged environments, especially in the case of loose buffer cables, conventional splice-on or pre-terminated connectors are not sufficient to ensure reliable operation.

SUMMARY

Disclosed is a terminus for a fiber optic cable. The fiber optic cable may be field terminated with the terminus and the terminated fiber optic cable may be subsequently used in harsh environments for data communications. Therefore, the terminus may be considered a field-installable rugged terminus. The disclosed terminus addresses the issues arising in the prior art. The terminus includes an alignment member in which a rearward end face of a fiber stub is aligned with and mated to a forward end face of a fiber of the fiber optic cable. In one embodiment, the alignment member is attached to or made part of a ferrule holder. The alignment member is transparent to one more wavelengths of light, such as visible light and/or UV light used to cure index matching UV-cure adhesive in the terminus. The fiber and the buffer of the fiber optic cable are cured to the alignment member. The buffer, fiber, alignment member, ferrule and fiber stub may piston together in the terminus body. As a result, the terminus recreates the pull-proof mechanical properties of a factory termination for rugged applications without requiring a long adhesive cure or the use of polishing equipment in the field. Also, the termination of the fiber optic cable may be completed in minutes rather than hours. Once terminated, the fiber optic cable with the terminus may be used in rugged environments and is capable of withstanding temperature extremes and repeated mechanical stresses.

DETAILED DESCRIPTION

Figure 1:
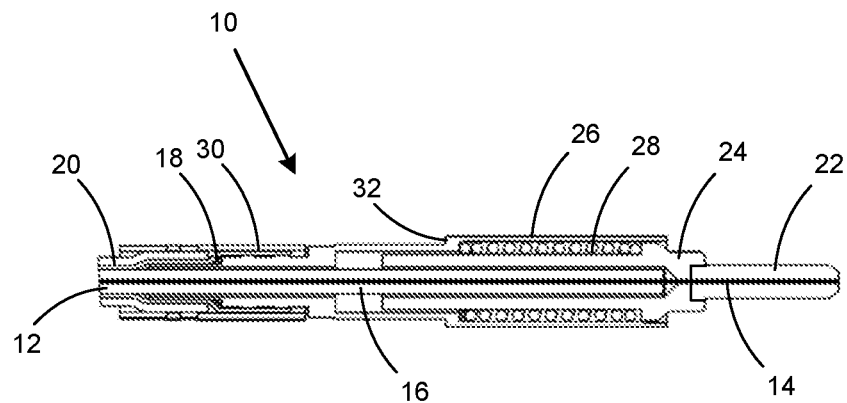
FIG. 1 is a cross-section of a conventional rugged terminus for a fiber optic cable.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Figure 3:
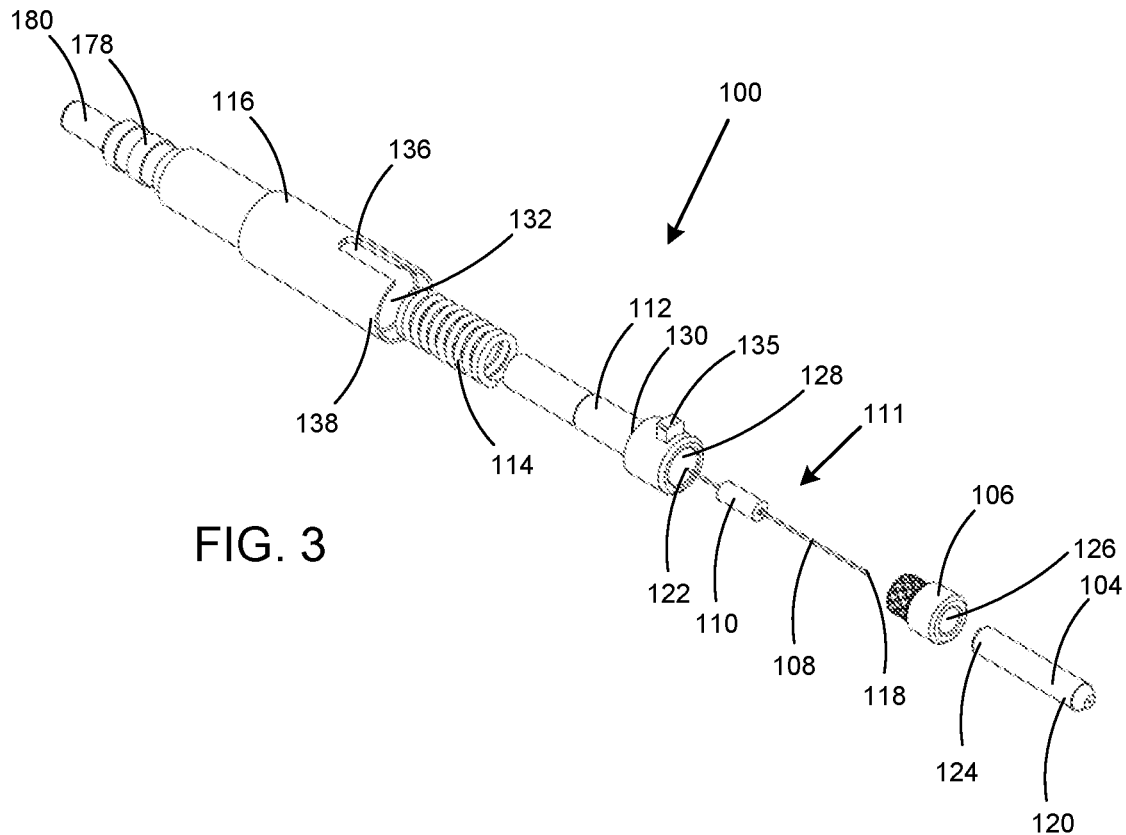
FIG. 3 is an exploded view of components of the terminus without the fiber optic cable.
Figure 4:
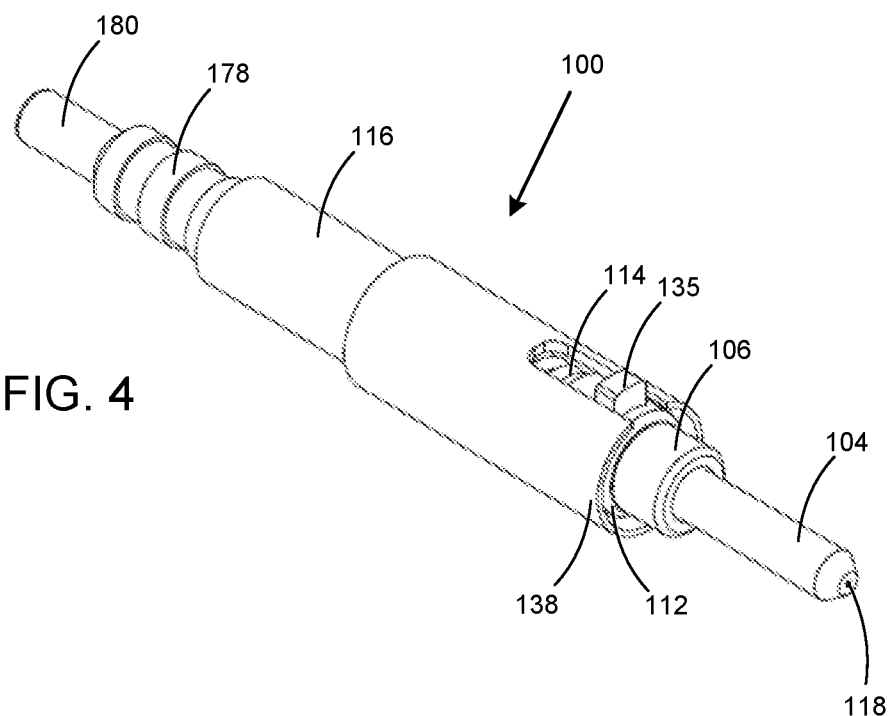
FIG. 4 is a perspective view of the terminus.
Figure 5:
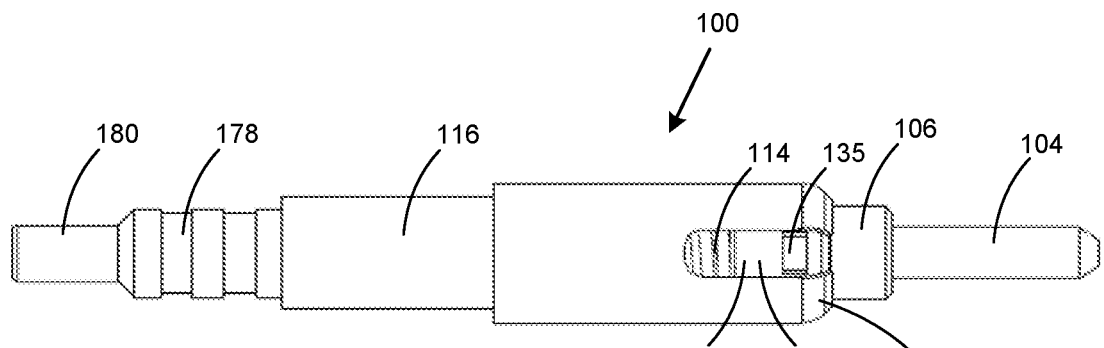
FIG. 5 is a top view of the terminus.
Figure 6:
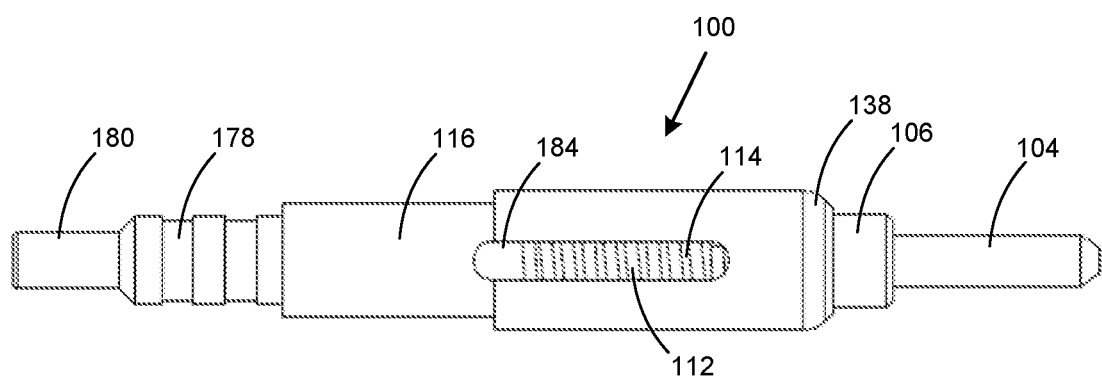
FIG. 6 is a bottom view of the terminus.
Figure 7:
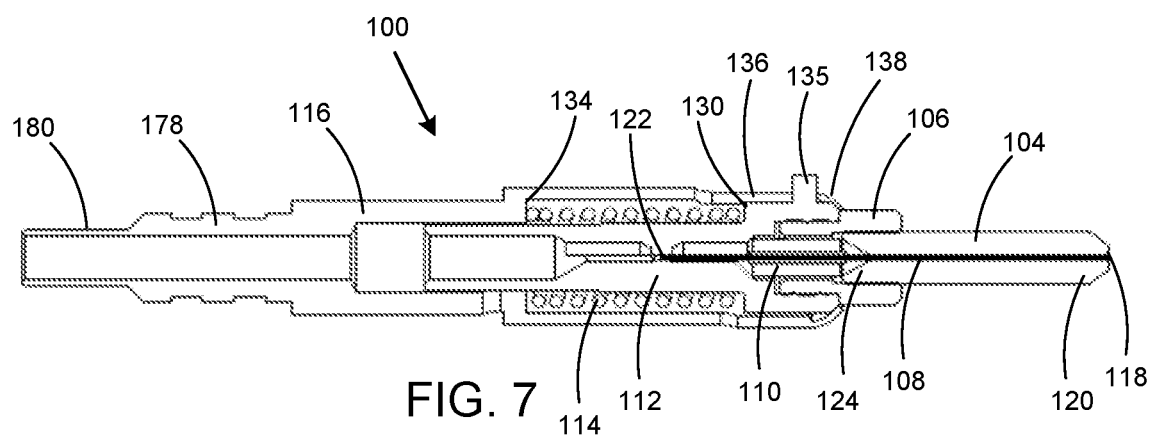
FIG. 7 is a longitudinal cross-section of the terminus.
Figure 8:
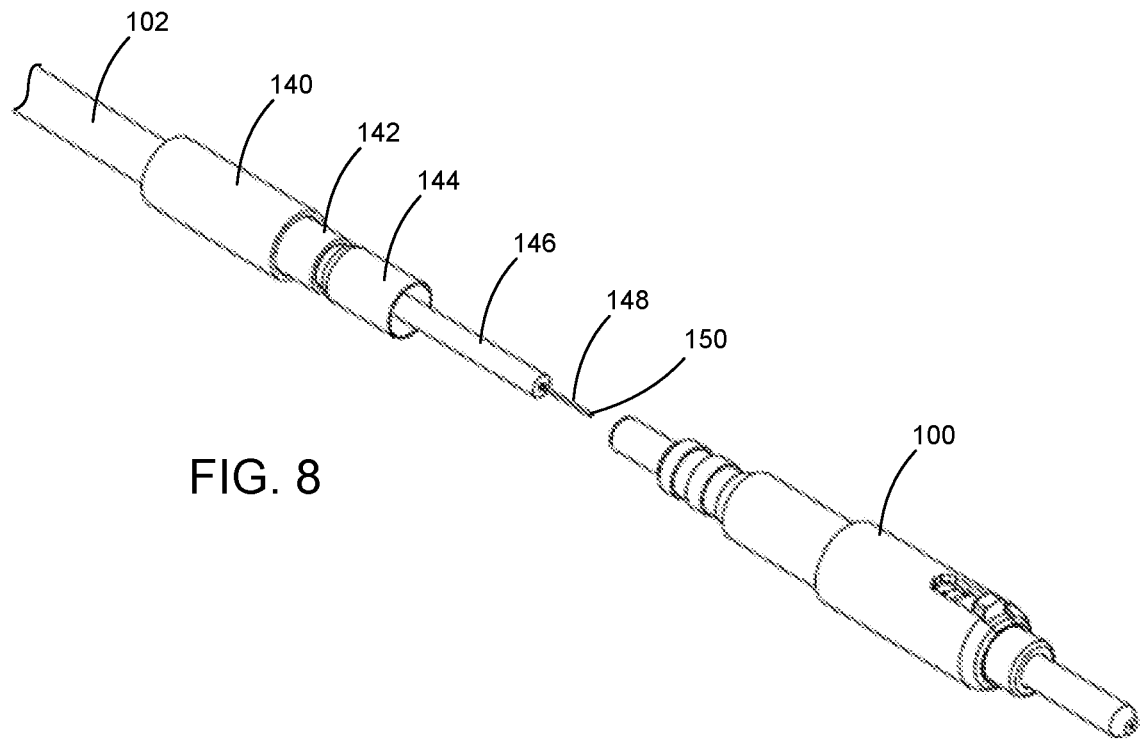
FIG. 8 is a perspective view of the terminus with the fiber optic cable before termination of the fiber optic cable.
Figure 9:
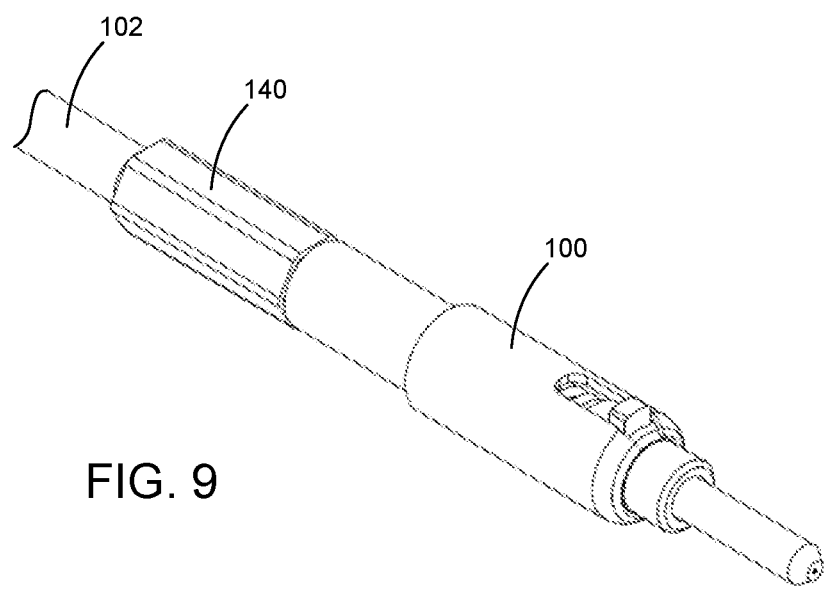
FIG. 9 is a perspective view of the terminus with the fiber optic cable following termination of the fiber optic cable.
Figure 10:
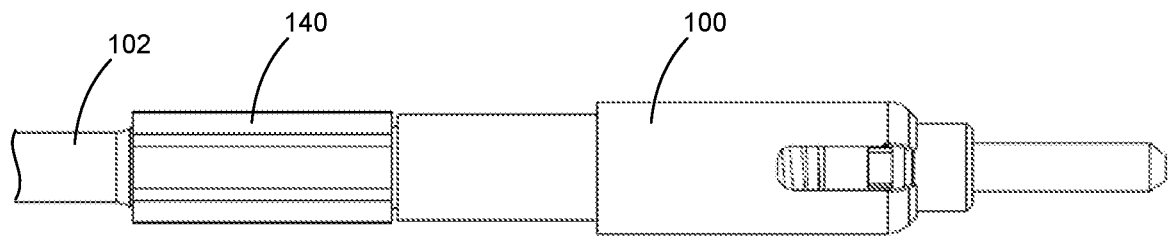
FIG. 10 is a top view of the terminated fiber optic cable.
Figure 11:
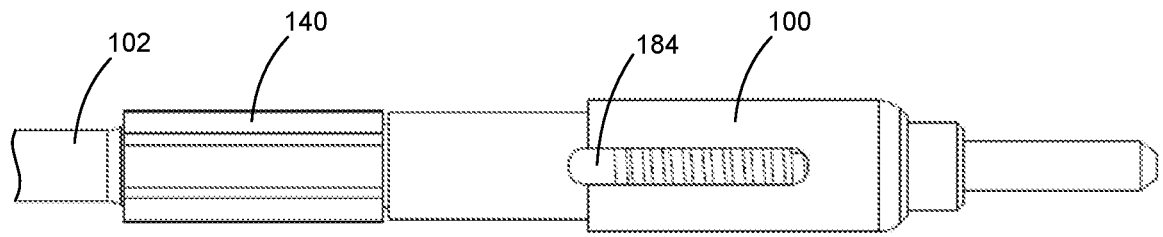
FIG. 11 is a top view of the terminated fiber optic cable.
Figure 12:
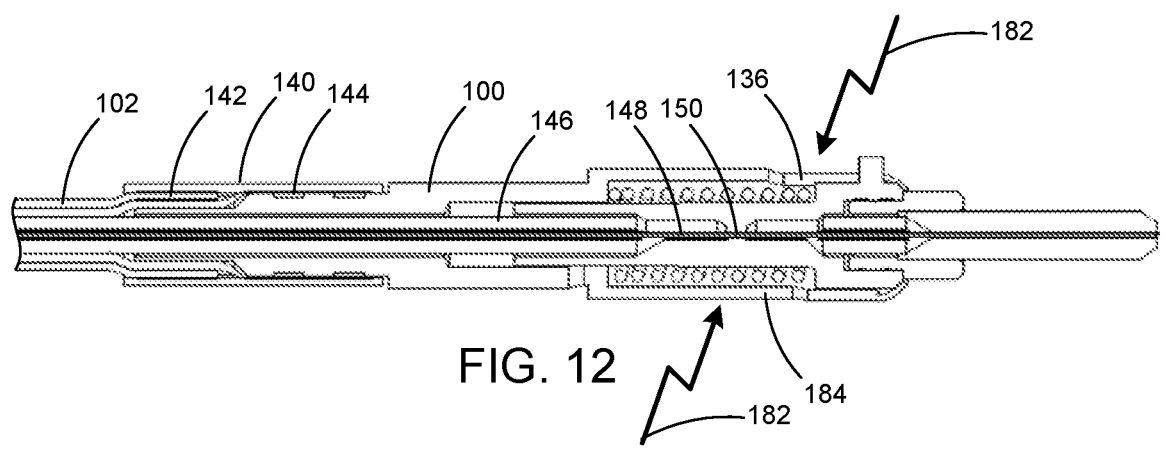
FIG. 12 is a longitudinal cross-section of the terminated fiber optic cable.

With reference to FIGS. 3 and 4, respectively illustrated are an exploded view of a terminus 100 and a perspective view of the terminus 100 in an assembled state prior to termination of a fiber optic cable 102 (FIG. 8). With additional reference to FIGS. 5 and 6, illustrated are a top view of the terminus 100 and a bottom view of the terminus 100. In addition, a cross-section taken along the longitudinal axis of the terminus 100 is shown in FIG. 7.

The terminus 100 of the illustrated embodiment includes a ferrule 104, a ferrule holder 106, a fiber stub 108, a buffer segment 110, a filament alignment member 112, a spring 114, and a terminus body 116. The ferrule 104 may be made from ceramic in the conventional manner. The ferrule holder 106 and terminus body 116 may be made from metal, but other materials (e.g., plastic such as acrylic or polyetherimide) are possible if non-conductive properties are desired. The filament alignment member 112 may be made from glass or plastic, and is preferably transparent to wavelengths of light used to cure UV adhesive in the terminus 100, as will be described.

The terminus 100 of the illustrated embodiment is constructed to be compatible with ARINC 801 receptacles and to have rugged characteristics, such as being "pull proof" and insensitive to temperature changes, mechanical shock and vibration. Aspects of the disclosed terminus 100 may be employed in other form factor termini.

Together, the fiber stub 108 and the buffer segment 110 are a buffered fiber stub 111. It will be understood, that the terminus 100 may have fewer components or may have additional components. As used herein, the terms "forward" and "rearward" refer to directions along a longitudinal axis of the terminus 100, with forward being in the direction of a front face 118 of the fiber stub 108 from a central portion of the fiber stub 108. The front face 118 is located at a forward end 120 of the ferrule 104 and is intended to optically connect with an optical component (not shown) into which the terminus 100 is eventually connected (e.g., a transceiver or passive optical device). Similarly, rearward is in the direction of a rear face 122 of the fiber stub 108 from a central portion of the fiber stub 108.

In a preferred embodiment, the terminus 100 is assembled using factory termination techniques. Steps involved in this process will be described, but it will be understood that additional steps may be added, one or more steps may be omitted, and some steps may be carried out concurrently or in an overlapping manner.

A rearward end 124 of the ferrule 104 may be press fit into a coordinating central bore 126 of the ferrule holder 106. In addition to or instead of a press fit, the ferrule 104 may be secured in the central bore 126 with adhesive. The central bore 126 of the ferrule holder 106 may have a stepped inner diameter to accommodate the ferrule 104 at a forward end of the ferrule holder 106 and to accommodate and radially support the buffer segment 110 at a rearward end of the ferrule holder 106.

The buffered fiber stub 111 starts as a length of buffered fiber, which may be considered a fiber optic cable having at least a filament that becomes the fiber stub 108 and a secondary buffer that becomes the buffer segment 110. A primary buffer may be present and, if present, is stripped away from the filament. Strength members and a jacket also may be present and, if present, are removed during the assembly process. Thus, it is more likely that manufacturers of the terminus 100 will opt to use an unjacketed cable to make the buffered fiber stub 111. The buffered fiber may be of tight buffer configuration. In another embodiment, the buffered fiber may be of loose buffer configuration. In either case, adhesive will further secure the buffer segment 110 to the fiber stub 108 and other components of the terminus 100 (e.g., the ferrule holder 106 and/or the alignment member 112) to fix the axial position of the buffer segment 110 relative to the fiber stub 108.

The buffered fiber is stripped to expose fiber forward of the buffer segment 110. The exposed fiber is inserted through the central channel of the ferrule 104 in the forward direction so as to extend beyond the front end 120 of the ferrule 104. The fiber is secured to the ferrule 104 with, for example, heat curable adhesive. Once cured, excess fiber forward of the ferrule 104 may be removed by cleaving. Then, the fiber is polished, which also removes excess adhesive at the forward end 120 of the ferrule 104. This forms the forward end 118 of the fiber stub 108 at the forward end 120 of the ferrule 104.

The buffered fiber is stripped to establish the buffer segment 110 and expose fiber rearward of the buffer segment 110. If a primary buffer is present, the primary buffer may be stripped rearward of the buffer segment 110. In another embodiment, the primary buffer may remain unstripped rearward of the buffer segment 110. The remaining buffer after stripping forms the buffer segment 110, which is of a defined length. The exposed fiber (and primary buffer, if present and unstripped) is precision cleaved to establish the rear face 122 of the fiber stub 108. The fiber is cleaved so that the rear face 122 is ultimately located in a precision fiber alignment section of the filament alignment member 112, as will be described.

The assembled ferrule 104, ferrule holder 106 and fiber stub 108 may be attached to the alignment member 112. For this purpose, a rearward portion of the ferrule holder 106 may be press fit into a coordinating central channel 128 of the alignment member 112. In addition to or instead of a press fit, the ferrule holder 106 may be secured in the central channel 128 with adhesive. A forward portion of the central channel 128 of the alignment member 112 may have a stepped inner diameter to accommodate the ferrule holder 106 and accommodate and radially support a rearward portion of the buffer segment 110 that extends rearward from the ferrule holder 106.

Figure 14:
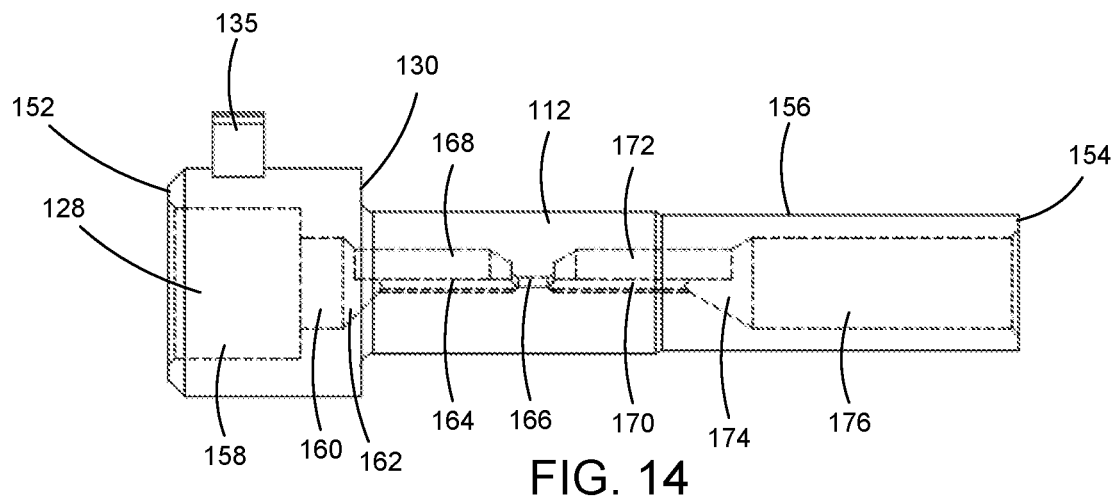

Prior to insertion of the assembled ferrule 104, ferrule holder 106 and fiber stub 108 into the alignment member 112, UV-curable adhesive that is index-matched (when cured) to the fiber stub 108 may be introduced into the alignment member 112, such as with a syringe. The UV-curable adhesive may be introduced, for example, into V-shape passage segment 164 (FIG. 14, described below) and forward buffer pocket 160 (FIG. 14, described below). The UV-curable adhesive may be used to bond the fiber stub 108 to the alignment member 112 and bond the buffer 110 to the alignment member 112. The UV-curable adhesive may be cured at this stage or left uncured. If left uncured, the UV-curable adhesive may be cured at the time of termination of the fiber optic cable 102. It may be advantageous to cure the UV-curable adhesive at the time of termination of the fiber optic cable 102 so as not to establish cured adhesive on the rear face 122 of the fiber stub 108 prior to termination of the fiber optic cable 102. Referring to prior steps, the heat curable adhesive used to bond the fiber stub 108 to the ferrule 104 also may be used to bond the buffer 110 to the rearward end 124 of the ferrule 104 and/or bond the buffer 110 to the ferrule holder 106.

In one embodiment, the ferrule holder 106 may be omitted and the ferrule 104 with buffered fiber stub 111 may be connected directly to the alignment member 112. In this embodiment, the forward portion of the central channel 128 may be reconfigured to directly accept the ferrule 104 and buffer segment 110.

The spring 114 may be placed around the alignment member 112 until a forward end of the spring 114 engages a shoulder 130 formed on the exterior sidewall of the alignment member 112. The assembled spring 114, alignment member 112, fiber stub 108, ferrule holder 106 and ferrule 104 may be inserted into an interior passage 132 of the terminus body 116 until a rearward end of the spring 114 engages a shoulder 134 in the interior passage 132. An alignment key 135 that extends radially from the exterior sidewall of the alignment member 112 radially extends from the terminus body 116 though a slot 136 in the sidewall of the terminus body 116. The alignment key 135 coordinates with an alignment groove or slot in a receptacle that receives the terminus 100. In one embodiment, the alignment key is integral with the alignment member 112, such as being secured to the alignment member 112 or of monolithic construction with the alignment member 112. In another embodiment, the alignment key 135 is integral with the ferrule holder 106.

A forward end 138 of the terminus body 116 is swaged inward to act as a forward travel stop to the forward end of the alignment member 112. This limits forward movement of the alignment member 112 relative to the terminus body 116 and, similarly, limits rearward movement of the terminus body 116 relative to the alignment member 112. By way of their connection to the alignment member 12, the swaged forward end of the alignment member 112 also serves to limit travel of the ferrule holder 106, the ferrule 104, and the front face 118 of the fiber stub 108. The amount of swaging is controlled so that the forward end 138 does not interfere with forward movement of the terminus body 116 over the ferrule holder 106 when the terminus 100 is installed in a coordinating receptacle. More specifically, the spring 114 forwardly biases the alignment member 112, connected ferrule holder 106 and ferrule 104, and the front face 118 of the fiber stub 108 relative to the terminus body 116. When the terminus 100 is installed in a connector or receptacle, forward force on the terminus body 116 may cause the spring 114 to compress and the terminus body 116 to move forward relative to the alignment member 112, connected ferrule holder 106 and ferrule 104, and the front face 118 of the fiber stub 108. The slot 136 extends longitudinally so that the alignment key 135 does not limit this relative movement of components.

With further reference to FIGS. 8-12 termination of the fiber optic cable 102 with the terminus 100 will be described. FIG. 8 shows the cable 102 and terminus 100 during the termination process. FIGS. 9, 10, 11 and 12 respectively show a perspective view, a top view, a bottom view and a cross section of the terminated cable 102.

Figure 2:
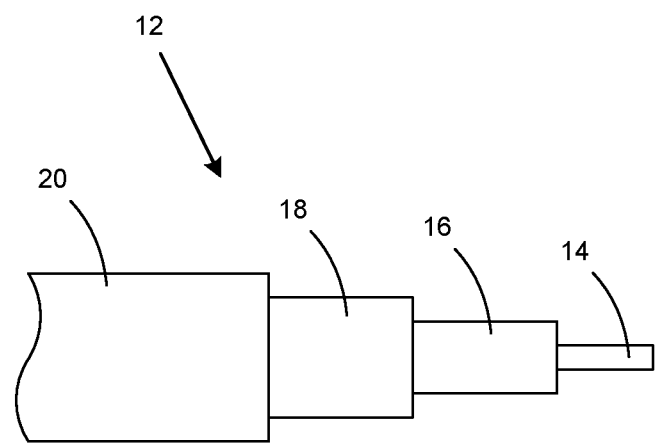
FIG. 2 is a schematic representation of the fiber optic cable.

As shown in FIG. 8, the cable 102 cable 102 is prepared for termination. The cable 102 cable 102 may be constructed in the manner described in connection with FIG. 2.

Alternatively, the cable 102 may be a buffered fiber without strength members and/or without a jacket. In one embodiment, the cable 102 has a loose buffer. If a jacket is present, the cable 102 may have either a tight jacket or a loose jacket. This type of cable is preferred by manufacturers of aircraft and other products that experience harsh conditions and require the use of rugged components for fiber optic connections. It will be understood, however, that the cable 102 may be tight buffer construction.

It is contemplated that preparation of the cable 102 for termination and completing the termination on the prepared cable may be completed by a trained technician in about five minutes or less. Of course, aspects of the terminus 100 and/or the termination process may be used in situations where preparation of the cable 102 for termination and completing the termination takes longer than five minutes.

Preparing the cable 102 may include sliding a crimp sleeve 140 over a jacket 142, stripping the jacket 142 to expose strength members 144, stripping the strength members 144 to expose a buffer 146, and stripping the buffer 146 to expose a filament 148. If the fiber stub 108 rearward of the buffer segment 110 includes a primary buffer, it is preferred that the cable 102 include a primary buffer that is not stripped from the filament 148. Alternatively, if a primary buffer is present, the primary buffer also may be stripped. Other cables 102 may not include a primary buffer. The filament 148 (and primary buffer, if present and not stripped) is precision cleaved to establish the front face 150 of the filament 148.

Figure 13:
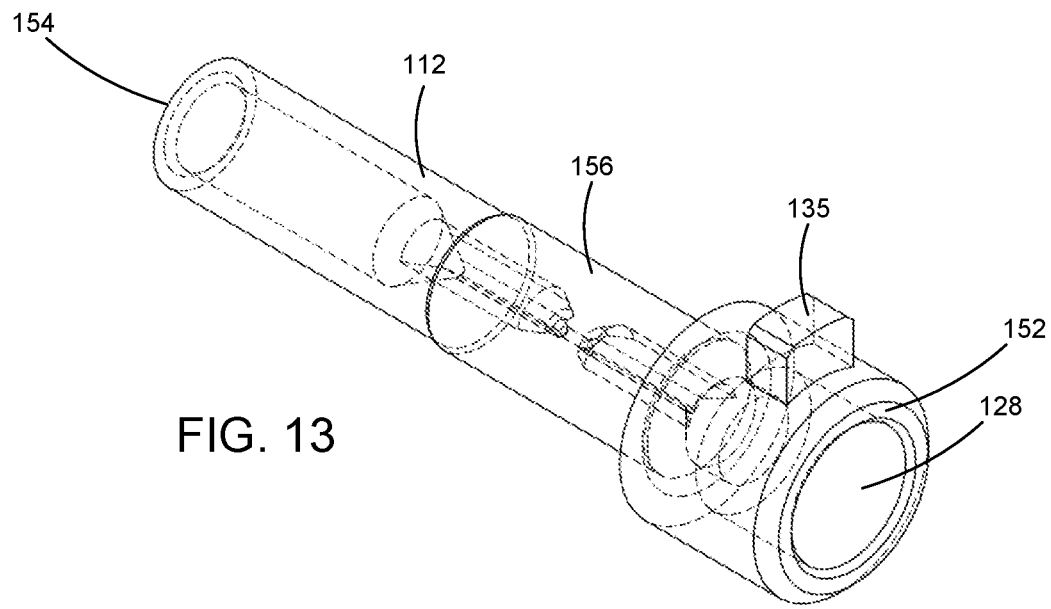
FIGS. 13-15 are views of an alignment member of the terminus in which internal structure is shown in broken lines.
Figure 15:
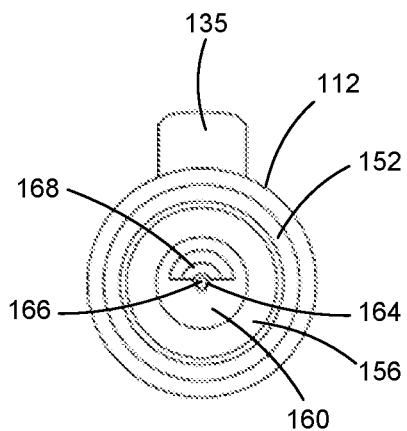

With additional reference to FIGS. 13-15, additional aspects of the filament alignment member 112 will be described. FIGS. 13, 14 and 15 respectively are a perspective view, a side view and a forward end view of the alignment member 112. Although the alignment member 112 may be clear (e.g., transmissive of visible light), internal structure is shown in broken lines to aid in illustration. The cross-sectional views of FIGS. 7 and 12 also may be referenced to understand the internal structure.

In general, the alignment member 112 is a tube-like structure having a forward end 152 and a rearward end 154 with the central passage 128 extending between the two ends 152, 154. An exterior wall 156 has a diameter that is enlarged forward the shoulder relative to the exterior wall 156 rearward of the shoulder 130, thus establishing the shoulder 130. The alignment key 135 radially extends from the enlarged portion of the exterior wall 156. Although some features of the alignment member 112 are described as circular or as having circular characteristics, it will be understood that other cross-sectional shapes are possible.

The central passage 128 varies in cross-sectional area and shape along a length of the alignment member 112. The various features of the central passage 128 will be described starting at the forward end 152 and proceeding rearward toward the rearward end 154. Adjacent the forward end 152, the passage 128 forms a cylindrical pocket 158 that is sized to accommodate the rearward portion of the ferrule holder 106. Rearward of the pocket 158 is a forward buffer pocket 160 that is sized to accommodate and radially support the buffer segment 110. Rearward of the forward buffer pocket 160, the central passage 128 defines a taper 162 that assists in guiding the rear face 122 of the fiber stub 108 into rearward portions of the central passage 128 that have a smaller cross-sectional area than the buffer pocket 160. For instance, the narrow rearward end of the taper 162 leads to a V-shaped passage segment 164. The V-shape passage segment 164 supports the fiber stub 108 and assists to guide the fiber stub 108 into a fiber alignment section 166 located rearward of the V-shaped passage segment 164. The V-shape passage segment 164 may have other shapes, including circular. In one embodiment, the fiber alignment section 166 may be considered a capillary tube.

The fiber alignment section 166 may be circular in cross section and have a diameter that is the same as or slightly larger than a diameter of the fiber stub 108 and the filament 148. If the fiber stub 108 and filament 148 include respective unstripped buffers, the fiber alignment section 166 may have a diameter that is the same as or slightly larger than a diameter of the fiber stub 108 with primary buffer and the filament 148 with primary buffer. In that regard, if the primary buffers are present, they will be respectively considered part of the fiber stub 108 and the filament 148. With or without the buffers, the fiber stub 108 and the filament 148 are considered to be directly and radially supported by the respective segments 164 and 170 of the alignment member 112 and by the fiber alignment section 166 of the alignment member 112.

The rearward end face 122 of the fiber stub 108 optically mates with the forward end face 150 of the filament 148 of the fiber optic cable 102 in the fiber alignment section 166. The size of the fiber alignment section 166 facilitates radial alignment of the end faces 122, 150. The end faces 122, 150 may come into physical contact with one another to establish the optical mating of the fiber stub 108 and the filament 148. It is also possible that a small amount of UV-curable adhesive is located between the end faces 122, 150. Since the UV-curable adhesive is index matched to the fiber stub 108 and filament 148 when cured, the presence of this UV-curable adhesive may be acceptable to establish the optical mating of the fiber stub 108 and the filament 148.

Radially adjacent the V-shape passage segment 164 may be a semi-circular or other shaped pocket 168. The pocket 168 facilitates manufacture of the smaller features of the central passage 128, such as the V-shape passage segment 164 and the fiber alignment section 166. In addition, the pocket 168 may accommodate excess UV-curable adhesive so as to facilitate flow of the UV-curable adhesive around the fiber stub 108 and the rearward end of the buffer segment 110. The pocket 168 also may serve as a volume to absorb air bubbles present in the UV-curable adhesive in the central passage 128 or introduced during assembly of the terminus 100. A forward end of the pocket 168 may open to the taper 162.

The fiber alignment section 166 leads to another V-shaped passage segment 170. The V-shape passage segment 170 supports the filament 148 and assists to guide the filament 148 into the fiber alignment section 166 located forward of the V-shaped passage segment 170. The V-shape passage segment 170 may have other shapes, including circular.

Radially adjacent the V-shape passage segment 170 may be a semi-circular or other shaped pocket 172. The pocket 172 facilitates manufacture of the smaller features of the central passage 128, such as the V-shape passage segment 170 and the fiber alignment section 166. In addition, the pocket 172 may accommodate excess UV-curable adhesive to facilitate flow of the UV-curable adhesive around the filament 148 and the buffer 146 of the cable 102. The pocket 172 also may serve as a volume to absorb air bubbles present in the UV-curable adhesive in the central passage 128 or introduced during termination of the cable 102. The V-shaped passage segment 170 and pocket 172 may open to a taper 174. The taper 174 assists in guiding the front face 150 of the filament 148 into forward portions of the central passage 128.

Rearward of the taper 174 is a rearward buffer pocket 176 that is sized to accommodate and radially support the buffer 146.

The alignment member 112 may be considered a static body. That is, the alignment member 112 does not change shape during termination and does not have parts that move relative to one another to accomplish termination. Thus, according to one embodiment, the fiber alignment portion 166 of the channel 128, and other portions of the channel 128, are statically configured.

Continuing with the description of the termination process, UV-curable adhesive that is index-matched (when cured) to the filament 148 and the fiber stub 108 may be introduced into the rearward portion of the central passage 128 of the alignment member 112, such as with a syringe. The UV-curable adhesive may be introduced, for example, into the V-shape passage segment 170 and the rearward buffer pocket 176. In one embodiment, this UV-curable adhesive is introduced in the field as part of the termination process. In another embodiment, this UV-curable adhesive is introduced in the factory as part of manufacture of the terminus 100.

Once the cable 102 is prepared and the UV-curable adhesive is in place, the cable 102 is inserted into the terminus 100. The cable 102 is advanced so that the filament 148 enters the fiber alignment section 166. Preferably, the forward face 150 of the filament 148 contacts the rearward face 122 of the fiber stub 108. Additionally, the buffer 146 enters the rearward buffer pocket 176 of the alignment member 112. The strength members 144 slide over (radially outward from) a forward crimp anchor portion 178 of the terminus body 116. Similarly, the strength members 144 and jacket 142 slide over (radially outward from) a rearward crimp anchor portion 180 of the terminus body 116.

At this point the components may be held together in the above-described configuration with a positioning tool (not shown). Next, the UV-curable adhesive is cured by illuminating the UV-curable adhesive with UV light (schematically illustrated by arrows 182 in FIG. 12) emitted by a UV light source (not shown). The UV light source may be part of the positioning tool. The UV light may be introduced into the terminus body 116 through the slot 136. The terminus body 116 may include one or more other windows for UV light to enter the terminus body 116. For example, in the illustrated embodiment, the terminus body 116 has an elongated window 184 located adjacent the spring 114 and alignment member 112. UV light entering the window 184 and the slot 136 may pass between the coils of the spring 116 and become incident on the alignment member 112. As indicated, the alignment member 112 is transparent to the UV light. Therefore, the UV light will pass through the alignment member 112 and become incident on the UV-curable adhesive. In the presence of the UV light, the UV curable adhesive will cure and establish a bond between the alignment member 112 and each of the buffer 146, the filament 148, the rearward portion of the fiber stub 108, and the buffer segment 110. This mechanically joins the alignment member 112 and each of the buffer 146, the filament 148, the rearward portion of the fiber stub 108, and the buffer segment 110 with the ferrule holder 106, ferrule 104 and forward face 118 of the fiber stub 108 so that they all move together relative to the terminus body 116.

Since the terminus 100 effectively includes a splice established between the end faces 122, 150, the terminus 100 may be referred to as a "pre-terminated terminus." But, the terminus 100 has similar ruggedize mechanically properties to the termination of the fiber 12 by the terminus 10 of FIG. 1. In one embodiment, no index matching (IM) gel is used in the terminus 100.

To complete the termination, the crimp sleeve 140 may be slid forward over the crimp anchor portions 178, 180 of the terminus body 116. The crimp sleeve 140 then may be crimped into place to trap the strength members 144 and jacket 142 between the terminus body 116 and the crimp sleeve 140.

Additional aspects of the disclosure will be understood from the appended claims, which form part of this specification.

The invention claimed is:

1. A terminus for a fiber optic cable that has a filament surrounded by a buffer, comprising:
   a ferrule having a forward end, a rearward end, and a channel extending between the forward and rearward ends;
   a fiber stub secured in the channel of the ferrule and the fiber stub having a polished forward end face at the forward end of the ferrule and a rearward end face, the fiber stub extending from the rearward end of the ferrule so that the rearward end face is rearwardly spaced from the rearward end of the ferrule;
   an alignment member axially aligned with the ferrule and having a forward end, a rearward end and a channel extending between the forward and rearward ends, the channel including a fiber alignment portion in which the rearward end face of the fiber stub is received, the fiber alignment portion configured to receive a forward end face of the filament in opposed relationship to the rearward end face of the fiber stub and axially align the forward end face of the filament with the rearward end face of the fiber stub; and
   a terminus body surrounding the alignment member; and
   wherein the alignment member is static and does not change shape during termination of the fiber optic cable with the terminus and does not have parts that move relative to one another during termination of the fiber optic cable with the terminus; and
   wherein, following termination, a rearward portion of the fiber stub and the filament of the fiber optic cable are bonded with curable adhesive to the fiber alignment portion and the buffer of the fiber optic cable is further bonded with the curable adhesive to an interior of the alignment member so as to mechanically join the alignment member and each of the buffer, the filament, and the fiber stub.

2. The terminus of claim 1, wherein the alignment member is forwardly biased in the terminus body by a spring.

3. The terminus of claim 1, wherein the terminus body has one or more openings through which radiation is passable for curing the curable adhesive.

4. The terminus of claim 1, wherein the terminus is configured to establish a pull-proof connection to the fiber optic cable and the fiber optic cable is of loose buffer configuration.

5. The terminus of claim 1, further comprising a buffer segment surrounding the fiber stub, the buffer segment rearward of the rearward end of the ferrule and a rearward end of the buffer segment located forward of the rearward end face of the fiber stub, the buffer segment radially supporting the fiber stub.

6. The terminus of claim 5, wherein the buffer segment is at least partially received in and radially supported by a forward buffer pocket of the channel of the alignment member.

7. The terminus of claim 6, wherein the buffer segment is further bonded with the curable adhesive to the forward buffer pocket of the channel of the alignment member so as to mechanically join the alignment member and each of the buffer, the filament, the fiber stub, the buffer segment, and the ferrule.

8. The terminus of claim 1, wherein the ferrule is secured at the rearward end of the ferrule to the alignment member.

9. The terminus of claim 1, wherein the ferrule is secured at the rearward end of the ferrule to a ferrule holder, and the ferrule holder is secured to the alignment member at the forward end of the alignment member.

10. The terminus of claim 9, further comprising a buffer segment surrounding the fiber stub rearward of the rearward end of the ferrule, at least a portion of the buffer segment radially supported by the ferrule holder.

11. The terminus of claim 10, wherein the buffer segment is at least partially received in and radially supported by a forward buffer pocket of the channel of the alignment member.

12. The terminus of claim 1, wherein the alignment member integrally includes a receptacle alignment key radially extending from an exterior side wall of the alignment member and through an opening in the terminus body.

13. The terminus of claim 1, wherein the alignment member is transmissive of UV radiation.

14. The terminus of claim 1, wherein the alignment member includes a rearward buffer pocket rearward end of the fiber alignment portion, the rearward buffer pocket configured to receive and radially support a portion of the buffer of the fiber optic cable.

15. The terminus of claim 1, wherein forward of the fiber alignment portion of the channel of the alignment member, the channel including a section configured to directly and radially support the fiber stub and radially align the fiber stub with the fiber alignment portion.

16. The terminus of claim 15, wherein rearward of the fiber alignment portion of the channel of the alignment member, the channel including a section configured to directly and radially support the filament of the fiber optic cable and radially align the filament with the fiber alignment portion.

17. The terminus of claim 16, wherein the channel includes a first pocket radially adjacent and fluidly coupled to the section configured to directly and radially support the fiber stub and a second pocket radially adjacent and fluidly coupled to the section configured to directly and radially support the filament.

18. A fiber optic cable assembly, comprising:
the terminus of claim 1; and
a fiber optic cable having a filament surrounded by a buffer, the fiber optic cable terminated by the terminus, wherein a portion of the filament is located in the channel of the alignment member and a forward end face of the filament is in operative optical connection with the rearward end face of the fiber stub in the fiber alignment portion of the alignment member.

19. The fiber optic cable assembly of claim 18, wherein the buffer of the fiber optic cable is secured in the channel of the alignment member.

20. The fiber optic cable assembly of claim 19, wherein the buffer of the fiber optic cable is secured to the alignment member with cured UV adhesive.

21. The fiber optic cable assembly of claim 18, wherein the filament is secured to the alignment member with cured UV adhesive.

22. The fiber optic cable assembly of claim 18, wherein the fiber optic cable further includes a jacket and strength members surrounding the buffer and the fiber optic cable assembly further comprises a crimp sleeve, the crimp sleeve trapping the jacket and strength members between the crimp sleeve and an anchor portion of the terminus body.

23. The fiber optic cable assembly of claim 18, wherein the fiber optic cable is of loose buffer configuration.

24. A method of terminating a fiber optic cable, the fiber optic cable having a filament surrounded by a buffer, strength members surrounding the buffer and a jacket surrounding the strength members, the method comprising:
providing a terminus having an alignment member having a forward end, a rearward end and channel extending between the rearward and forward ends, the channel comprising a fiber alignment portion containing a rearward end face of a fiber stub of the terminus, the terminus further having a ferrule coupled to the alignment member, a forward portion of the fiber stub secured in the ferrule and a forward end face of the fiber stub at a forward end of the ferrule, and wherein the alignment member is static and does not change shape during termination of the fiber optic cable with the terminus and does not have parts that move relative to one another during termination of the fiber optic cable with the terminus;
preparing the fiber optic cable including stripping the jacket, strength member and buffer, and cleaving the filament to establish a forward end face of the filament;
inserting the filament into the fiber alignment portion of the channel of the alignment member so that the forward end face makes operative optical connection with the rear end face of the fiber stub in the fiber alignment portion; and
bonding the filament and fiber stub to the fiber alignment portion with curable adhesive and bonding the buffer of the fiber optic cable to the alignment member so as to mechanically join the alignment member and each of the buffer, the filament, and the fiber stub.

25. The method of terminating a fiber optic cable of claim 24, wherein the bonding includes curing UV adhesive in the channel of the alignment member with UV radiation.

26. The method of terminating a fiber optic cable of claim 25, wherein the UV radiation enters the terminus through one or more openings of a terminus body that surrounds the alignment member.

27. A terminus for a fiber optic cable that has a filament surrounded by a buffer, wherein a forward portion of the filament has a forward end face, comprising:
a ferrule having a forward end, a rearward end, and a ferrule channel extending between the forward and rearward ends;
a fiber stub secured in the ferrule channel and the fiber stub having a polished forward end face at the forward end of the ferrule and a rearward end face, the fiber stub extending from the rearward end of the ferrule so that the rearward end face is rearwardly spaced from the rearward end of the ferrule;

an alignment member axially aligned with the ferrule and having a forward end, a rearward end and an alignment member channel extending between the forward and rearward ends, the fiber stub extending into the alignment member channel so that a rearward part of the fiber stub including the rearward end face is located in the alignment member channel, the alignment member channel configured to receive the forward portion of the filament including the forward end face of the filament and a forward portion of the buffer of the fiber optic cable, and wherein the forward portion of the filament, the forward portion of the buffer and the rearward portion of the fiber stub, following termination, are bonded with curable adhesive so as to mechanically join the alignment member and each of the buffer, the filament, and the fiber stub; and a terminus body surrounding the alignment member.

28. The terminus of claim 27, wherein the curable adhesive establishes bonds between the interior wall of the alignment member and the forward portion of the filament, the forward portion of the buffer and the rearward portion of the fiber stub.

29. The terminus of claim 27, wherein the curable adhesive is UV curable adhesive.

30. The terminus of claim 29, wherein the alignment member is transmissive of UV radiation.

31. The terminus of claim 27, wherein the terminus body has one or more openings through which radiation is passable for curing the adhesive.

32. The terminus of claim 27, further comprising a buffer segment surrounding the fiber stub, the buffer segment rearward of the rearward end of the ferrule and a rearward end of the buffer segment located forward of the rearward end face of the fiber stub, the buffer segment radially supporting the fiber stub and a portion of the buffer segment located in and bondable to the alignment member channel.

* * * * *